United States Patent [19]

Tanaka et al.

[11] Patent Number: 4,617,340

[45] Date of Patent: Oct. 14, 1986

[54] SILICONE-CONTAINING FABRIC TREATMENT AGENT

[75] Inventors: Masaki Tanaka; Hiroshi Ohashi, both of Gunma, Japan

[73] Assignee: Shin-Etsu Chemical Co., Ltd., Tokyo, Japan

[21] Appl. No.: 740,983

[22] Filed: Jun. 4, 1985

[30] Foreign Application Priority Data

Jun. 6, 1984 [JP] Japan .................................. 59-115809

[51] Int. Cl.$^4$ .............................................. C08L 83/00
[52] U.S. Cl. ...................................... 524/588; 524/860; 525/440; 525/453; 528/28; 528/29; 427/387; 427/389.9; 428/447
[58] Field of Search .................. 528/29, 28; 525/440, 525/453; 524/860, 588

[56] References Cited

U.S. PATENT DOCUMENTS 4,130,708 12/1978 Friedlander et al. .................. 528/28
4,457,887  7/1984 Porsche ................................. 528/29

*Primary Examiner*—Melvyn I. Marquis
*Attorney, Agent, or Firm*—Toren, McGeady, Stanger, Goldberg & Kiel

[57] ABSTRACT

The inventive fabric treatment agent can impart excellent hydrophilicity to fabric materials of, in particular, synthetic fibers with durability and launderability. The principal ingredient of the agent is a copolymer composed of three types of moieties including (a) a diorganopolysiloxane terminated at both molecular chain ends each with a non-silanolic hydroxy group or other active hydrogen-containing group, e.g. —SH, —COOH and —NH$_2$, (b) a polyol compound having polyoxyalkylene linkages which is typically a polyoxyethylene glycol and (c) a diisocyanate compound which serves as a coupling agent between the moieties (a) and (b).

7 Claims, No Drawings

SILICONE-CONTAINING FABRIC TREATMENT AGENT

BACKGROUND OF THE INVENTION

The present invention relates to a silicone-containing fabric treatment agent or, more particularly, to a silicone-containing fabric treatment agent capable of imparting pleasantly soft touch and hydrophilicity and water-absorptivity with launderability and durability to a fabric material treated therewith.

Needless to say, fabric materials made of various kinds of synthetic fibers are used for clothing while the most serious defect of synthetic fiber-made clothes in general is the hydrophobicity or poor hydrophilicity of the synthetic fiber so that, when the clothes are underwears in direct contact with the wearer's skin, in particular, the wearer sometimes feels heavy stuffiness in a hot or humid weather or after sporting with perspiration due to the incapability of the clothes to absorb perspiration.

Various attempts and proposals have been hitherto made to solve this problem. For example, a free radical-polymerizable monomer having a hydrophilic group in the molecule is graft-polymerized on to the surface of a hydrophobic synthetic fiber by the irradiation with ultraviolet light or an ionizing radiation or in the presence of a free radical polymerization initiator. Alternatively, hydrophobic synthetic fibers are treated with a hydrophilic fabric treatment agent such as a quaternary ammonium salt, polyether compound or a silicone-modified compound thereof and the like to render the surface of the fibers hydrophilic or to render the fiber water-absorptive (see, for example, Japanese Patent Kokai 52-96297 and 58-54079). The former method of the graft-polymerization, however, is economically disadvantageous because of the complicacy of the working process which requires special apparatuses. The latter method of using a hydrophilic treatment agent, on the other hand, has a problem in the durability of the hydrophilic nature of the fabric material after treatment with the treatment agent because all of the hydrophilic fabric treatment agents are so highly hydrophilic or water-soluble that the compound on the fiber surfaces is readily dissolved away when the treated fabric material is washed or laundered to be left scarcely on the fiber surface. Therefore, the hydrophilic effect of the treatment is limited only before the first laundering of the treated fabric material as a fatal defect of the method so that it has been eagerly desired in the fabric industry to develop a fabric treatment agent capable of imparting durable hydrophilicity to the fabric materials treated therewith.

SUMMARY OF THE INVENTION

An object of the present invention is therefore to provide a novel fabric treatment agent capable of imparting hydrophilicity or water-absorptivity with durability and launderability to a fabric material of a synthetic fiber treated therewith along with pleasant touch of softness.

Another object of the invention is accordingly to provide a method for imparting hydrophilicity or water-absorptivity with durability and launderability to a fabric material of a synthetic fiber along with pleasant touch of softness by treating the fabric material with a fabric treatment agent.

Thus, the fabric treatment agent of the invention comprises, as the principal ingredient, a copolymer composed of three types of moieties including:
(a) a diorganopolysiloxane in a liquid form represented by the general formula

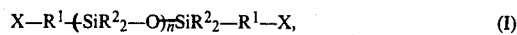

$$X-R^1-(SiR^2{}_2-O)_n SiR^2{}_2-R^1-X, \quad (I)$$

in which $R^1$ is a divalent organic group, $R^2$ is a substituted or unsubstituted monovalent hydrocarbon group having from 1 to 20 carbon atoms, X is an active hydrogen-containing functional group selected from the class consisting of a hydroxy group —OH, mercapto group —SH, carboxyl group —COOH and amino group —NH$_2$ and n is a positive integer not smaller than 10; (b) from 1 to 10 moles of a polyol compound having polyoxyalkylene linkages per mole of the moiety (a) above; and (c) a diisocyanate compound in such an amount that the molar ratio of the isocyanate groups —NCO in the diisocyanate compound to the overall hydrogen atoms of the functional groups X in the moiety (a) and the hydroxy groups in the moiety (b), i.e. —NCO/H, is in the range from 0.05 to 1.

DETAILED DESCRIPTION OF THE PREFERRED EMBODIMENTS

As is understood from the above description, the principal ingredient comprised in the inventive fabric treatment agent is a copolymer composed of three kinds of moieties including the above specified (a), (b) and (c) in the specified proportions.

The first type of the moieties (a) is a diorganopolysiloxane represented by the above given general formula (I). In the formula, $R^1$ is a divalent organic group or typically a divalent hydrocarbon group which may contain oxygen, nitrogen and other hetero atoms bonded to the carbon atom or atoms. Several of the examples of the group $R^1$ include $-(CH_2)_2-$, $-(CH_2)_3-$, $-CH(CH_3)-(CH_2)_2-$, $-(C_2H_4-O)_a(CH_2)_2-$, the suffix a being a positive integer, $-(CH_2)_2NH-(CH_2)_3-$, $-CH(CH_2Cl)-CH_2-O-(CH_2)_3-$ and the like. The symbol $R^2$ in the formula is a substituted or unsubstituted monovalent hydrocarbon group having from 1 to 20 carbon atoms exemplified by alkyl groups, e.g. methyl, ethyl, propyl and butyl groups, alkenyl groups, e.g. vinyl and allyl groups, aryl groups, e.g. phenyl and tolyl groups, and cycloalkyl groups, e.g. cyclohexyl group, as well as those substituted groups obtained by the replacement of a part or all of the hydrogen atoms in the above named hydrocarbon groups with substituents such as halogen atoms, cyano groups and the like. The groups denoted by $R^2$ in a molecule may not be the same ones but may be different ones each independently from the others although it is a preferable condition that at least 50% in number of all of the groups $R^2$ in a molecule are methyl groups. The suffix n is a positive integer not smaller than 10 and (n+1) gives the so-called degree of polymerization of the polysiloxane molecule. The symbol X at each of the molecular terminals is a functional group having one or more active hydrogen atoms selected from the class consisting of hydroxy —OH, mercapto —SH, carboxyl —COOH and amino —NH$_2$ groups. Accordingly, the groups denoted by $X-R^1-$ is exemplified by the groups of the formulas $-(CH_2)_2OH$, $-(CH_2)_3OH$, $-(CH_2)_2CH(OH)-CH_3$, $-(CH_2)_2CH(OH)-CH=CH_2$, $-(CH_2)_2(O-C_2H_4)_aOH$, the suffix a being as defined above, $-(CH_2)_3SH$, $-(CH_2)_3COOH$, $-(CH_2)_3NH_2$, $-(CH_2)_3N-$ H—(CH$_2$)$_2$NH$_2$ and —(CH$_2$)$_3$O—CH$_2$—CH(OH)—CH$_2$—Cl as well as 2-(3-chloro-4-hydroxycyclohexyl)ethyl group and others.

The diorganopolysiloxane moiety (a) in the copolymer can be synthesized in a variety of synthetic routes including those expressed by the following reaction equations, in which Me and Ep denote a methyl group and an epoxy group, respectively:

(1) H—(SiMe$_2$—O)$_{\overline{n}}$SiMe$_2$—H + CH$_2$=CH—CH$_2$OH → HO—(CH$_2$)$_3$(SiMe$_2$—O)$_{\overline{n}}$SiMe$_2$—(CH$_2$)$_3$OH, in the presence of a platinum catalyst;

(2) H—(SiMe$_2$—O)$_{\overline{n}}$SiMe$_2$—H + CH$_2$=CH—(CH$_2$—O—C$_2$H$_4$)$_5$OH → HO—(C$_2$H$_4$—O)$_5$(CH$_2$)$_3$(SiMe$_2$—O)$_{\overline{n}}$SiMe$_2$—(CH$_2$)$_3$(O—C$_2$H$_4$)$_5$OH, in the presence of a platinum catalyst;

(3) H—(SiMe$_2$—O)$_{\overline{n}}$SiMe$_2$—H + CH$_2$=CH—CH(OH)—Me → Me—CH(OH)—(CH$_2$)$_2$(SiMe$_2$—O—)$_n$—SiMe$_2$—(CH$_2$)$_2$CH(OH)—Me, in the presence of a platinum catalyst;

(4) H—(SiMe$_2$—O)$_{\overline{n}}$SiMe$_2$—H + CH$_2$=CH—CH$_2$—O—(CH$_2$—Ep→Ep—CH$_2$—O—CH$_2$)$_3$—(SiMe$_2$—O)$_{\overline{n}}$SiMe$_2$—(CH$_2$)$_3$O—CH$_2$—Ep, in the presence of a platinum catalyst, followed by the reaction with hydrogen chloride HCl to effect ring-opening of the epoxy groups and to give a product of the formula Cl—CH$_2$—CH(OH)—CH$_2$—O—(CH$_2$)$_3$—(SiMe$_2$—O—)$_n$SiMe$_2$—(CH$_2$)$_3$O—CH$_2$—CH(OH)—CH$_2$—Cl;

(5) 1,1,3,3-tetramethyl-1,3-di(3-aminopropyl)disiloxane + octamethylcyclotetrasiloxane → H$_2$N—(CH$_2$)$_3$—(SiMe$_2$—O)$_{\overline{n}}$SiMe$_2$—(CH$_2$)$_3$NH$_2$, in the presence of potassium hydroxide as a catalyst;

(6) 1,1,3,3-tetramethyl-1,3-di(3-mercaptopropyl)disiloxane + octamethylcyclotetrasiloxane → HS—(CH$_2$)$_3$—(SiMe$_2$—O)$_{\overline{n}}$SiMe$_2$—(CH$_2$)$_3$SH, in the presence of sulfuric acid as a catalyst; and (7) H—(SiMe$_2$—O)$_{\overline{n}}$SiMe$_2$—H + CH$_2$=CH—CH$_2$—COOH—HO—CO—(CH$_2$)$_3$(SiMe$_2$—O)$_{\overline{n}}$SiMe$_2$—(CH$_2$)$_3$CO—OH, in the presence of a platinum catalyst.

In the next place, the moiety of the second type (b) is a polyol compound having polyoxyalkylene linkages in the molecule represented by the general formula $$HO—(R^3—O)_{\overline{b}}H, \quad (II)$$

in which R$^3$ is a divalent hydrocarbon group having from 2 to 4 carbon atoms such as ethylene —C$_2$H$_4$—, propylene —C$_3$H$_6$— and butylene —C$_4$H$_8$— groups and the suffix b is a positive integer of such a value that the average molecular weight of the polyol compound is in the range from 100 to 5000. Although the groups denoted by R$^3$ in a molecule may not be of the same kind, it is preferable that at least 50% by moles of the groups R$^3$ in a molecula are ethylene groups —C$_2$H$_4$—.

An alternative class of the polyol compounds having polyoxyalkylene linkages in the molecule includes a nitrogen-containing compound, i.e. an alkylamine polyoxyalkylene adduct, represented by the general formula $$H—(O—R^3)_{\overline{c}}NR^2—(R^3—O)_{\overline{d}}H, \quad (III)$$

in which R$^2$ and R$^3$ each have the same meaning as defined above and c and d are each a positive integer independently from the other, preferably, not exceeding 100. In comparison with the polyoxyalkylene diol of the formula (II), the compounds of this class are advantageous in respect of the higher hydrophilicity and softness of the fabric material treated with the inventive treatment agent including such a type of the moiety although such a nitrogen-containing ingredient of the agent may cause a problem of yellowing of the fabric material.

The third moiety (c) forming the copolymer is a diisocyanate compound, i.e. a compound having two isocyanate groups —NCO in a molecule exemplified by tolylene diisocyanate, hexamethylene diisocyanate, diphenylmethane diisocyanate, trimethylhexamethylene diisocyanate and dimeric acid diisocyanate and the like. These diisocyanate compounds serve as a coupling agent between the moieties (a) and (b). It should be noted that, because of the extremely high reactivity of the diisocyanate compound, any trace amount of the diisocyanate compound left unreacted in the inventive fabric treatment agent, which may be an aqueous emulsion or an organic solution, is very undesirable due to the unnecessary or detrimental reaction possibly to cause gelation of the copolymer. Therefore, the polymerization mixture for the preparation of the copolymer should be formulated with the diisocyanate compound in such an amount that the molar ratio of the isocyanate groups to the active hydrogen atoms, i.e. the hydrogen atoms in the hydroxy, mercapto, carboxyl and amino groups, in the moieties (a) and (b) should not exceed 1.

The polymerization reaction to produce the copolymer as the principal ingredient of the inventive fabric treatment agent can proceed spontaneously even by merely blending the diorganopolysiloxane, polyol and diisocyanate compounds uniformly. It is, however, preferable that the polymerization mixture is diluted with an organic solvent in order to prevent unnecessary viscosity increase of the polymerization mixture or eventual gelation of the copolymer as the reaction product. The organic solvent should preferably have a dissolving power for all of the diorganopolysiloxane, polyol and diisocyanate compounds so that the polymerization of these reactants, which sometimes have no or poor compatibility with each other, can be performed in a uniform solution by an appropriate selection of the solvent. Suitable organic solvents include, for example, aromatic hydrocarbon solvents, e.g. benzene, toluene and xylene, halogenated aliphatic hydrocarbon solvents, e.g. trichloroethylene, perchloroethylene and trichloroethane, and petroleum solvents, e.g. kerosine and mineral spirit. The polymerization reaction can be accelerated by the admixture of a catalyst, if desired. Suitable catalysts are exemplified by metal-containing organic compounds and metal salts of organic acids such as dibutyltin diacetate, dibutyltin dioctoate, dibutyltin dilaurate, dioctyltin diacetate, dioctyltin dioctoate, dioctyltin dilaurate, zinc octoate, lead laurate, tetrabutyl titanate and aluminum triacetate.

The polymerization reaction of the diorganopolysiloxane, polyol and diisocyanate compounds can readily proceed when these reactants are uniformly dissolved in an organic solvent, optionally, together with a catalyst and the mixture is heated with agitation. It is of course optional that the reactants are added to the organic solvent successively in any desired order provided that smooth proceeding of the reaction and stability of the reaction product can be ensured and the above mentioned undesirable condition of excessiveness of the isocyanate compound over the active hydrogen atoms in the diorganopolysiloxane and polyol compounds is avoided.

The polymerization mixture after completion of the reaction in the form of an organic solution can be used as such as the inventive fabric treatment agent. It is optional that the organic solvent of the polymerization mixture after completion of the reaction is stripped off by distillation under reduced pressure and then the residue is emulsified in water by use of a suitable surface active agent to give the inventive fabric treatment agent in the form of an aqueous emulsion.

Fabric materials can be imparted with sufficiently hydrophilic nature as desired by merely dipping in the thus prepared organic solution or aqueous emulsion followed by drying. It is sometimes preferable when further increased durability is desired of the effect of hydrophilic treatment that the inventive fabric treatment agent is used in combination with a known resinous fabric treatment composition. An example of such a resinous fabric treatment composition is an aqueous solution or emulsion obtained by dispersing a polyurethane formed by blocking the isocyanate groups at the molecular terminals of a polyurethane prepolymer with phenol, sodium sulfite and the like. Glyoxal resins, melamine resins and ethyleneurea resins are also usable. The durability of the effect by the hydrophilic treatment of a fabric material with the inventive fabric treatment agent can be increased also by the admixture of a small amount of a metal catalyst for polyurethane resins such as dibutyltin dilaurate, dioctyltin dilaurate and the like.

In the following, the inventive fabric treatment agent is described in more detail by way of examples. In the following description, the values of viscosity are all those obtained by the measurment at 25° C.

EXAMPLE 1

Into a glass-made reaction vessel equipped with a stirrer, water-cooled condenser and thermometer were introduced 82.8 g of a dimethylpolysiloxane having a viscosity of 40 centistokes terminated at both molecular chain ends each with a 3-hydroxypropyl group as expressed by the average formula $$HO-(-CH_2)_3(SiMe_2-O)_{20}SiMe_2-(-CH_2)_3OH,$$

Me being a methyl group, 120 g of a polyethyleneglycol having an average molecular weight of about 400, 13.2 g of tolylene diisocyanate and 500 g of toluene to form a reaction mixture which was agitated for 2 hours at 100° C. to effect the reaction and then admixed with 0.1 g of dibutyltin dilaurate as a catalyst followed by further agitation for 4 hours at the same temperature. A small portion of the reaction mixture was taken and analyzed by the infrared absorption spectrophotometry to confirm that the absorption band at about 2260 cm$^{-1}$ assigned to the isocyanate group —NCO had disappeared to indicate completion of the reaction. The solvent in the reaction mixture was then stripped off by distillation over a period of 2 hours at 80° C. under a reduced pressure of 10 mmHg to leave 215 g of a somewhat cloudy, light yellow fluid having a viscosity of 5500 centipoise. This product is referred to as the copolymer A hereinbelow.

Similarly to the above procedure, 34.0 g of a hydroxy-terminated dimethylpolysiloxane having a viscosity of 45 centistokes and expressed by the average formula

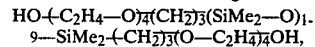

in a varied amount as indicated in Table 1 below, polyethyleneglycol having an average molecular weight of about 400, 10.5 g of diphenylmethane diisocyanate and 300 g of toluene were introduced into the reaction vessel to form a reaction mixture which was agitated at 100° C. for 3 hours to effect the reaction and then admixed with 0.1 g of dibutyltin dilaurate followed by further agitation at 80° C. for 3 hours. After confirmation of completion of the reaction by the infrared absorption spectrophotometry in the same manner as in the preparation of the copolymer A, the solvent in the reaction mixture was stripped off also in the same manner as above to give a product. Three preparations were performed with different formulations of the starting reactants to give reaction products referred to as the copolymers B, C and D hereinbelow. The appearance and viscosity of each of these copolymers are shown in Table 1.

TABLE 1

| | Copolymer B | Copolymer C | Copolymer D |
|---|---|---|---|
| Polyethyleneglycol, g | 16.8 | 32.0 | 48.0 |
| Appearance | Light yellow, semi-transparent | Light yellow, cloudy | Light yellow, cloudy |
| Viscosity, centipoise | Higher than 1,000,000 | 80,000 | 15,000 |

Each of the above obtained copolymers A to D was dissolved in toluene in a concentration of 1% by weight and a knit cloth of polyester having water repellency after desizing by washing in advance was dipped in the toluene solution and then squeezed in a mangle to give a pick-up of the solution of 80% by weight followed by drying at 100° C. for 3 minutes and then curing at 150° C. for 2 minutes. Each of the thus treated cloths was subjected to the evaluation of the water absorptivity by the B method and the water drop soaking test according to the procedures specified in JIS L 1079 to give the results shown in Table 2 below. These tests were repeated after 1, 3 and 10 times of washing of the treated cloth in an electric washer for household use to give the results also shown in Table 2.

For comparison, the same water absorptivity tests as above were undertaken of an untreated cloth and another cloth treated with a polyether-modified dimethylpolysiloxane (referred to as the polysiloxane A hereinbelow) expressed by the average formula

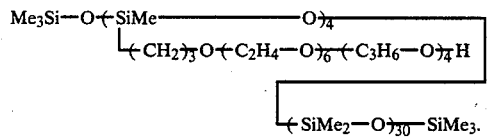

The results of these comparative tests are also shown in Table 2.

The procedures of the tests for the water absorptivity by the Bireck method and water drop soaking method and washing of the treated cloths in the above tests were as given below.

Water absorptivity test by B (JIS) method: a test cloth of 20 cm length and 5 cm width vertically held was contacted with water surface at the lower end and the height of the cloth wetted with the absorbed water after 15 minutes was recorded in cm. The values obtained in 3 times of the tests were averaged.

Water absorptivity test by water drop soaking: 0.1 ml of water was dropped on a horizontally spread test cloth and the length of time taken for complete absorption of the water drop into the cloth was recorded in seconds.

Washing of treated cloth: the test cloth was washed for 15 minutes at 40° C. in a 2 g/liter aqueous solution of a neutral detergent in a bath ratio of 50 followed by rinse for 15 minutes in running water and drying.

TABLE 2

| Treated with | Testing method | As treated | Times of washing | | |
|---|---|---|---|---|---|
| | | | 1 | 3 | 10 |
| Copolymer A | B (JIS) | 10.0 | 5.0 | 4.1 | 3.3 |
| | Soaking | 0 | 2 | 15 | 31 |
| Copolymer B | B (JIS) | 6.7 | 4.0 | 3.1 | 2.5 |
| | Soaking | 0 | 10 | 25 | 42 |
| Copolymer C | B (JIS) | 8.5 | 6.2 | 5.5 | 4.7 |
| | Soaking | 0 | 0 | 10 | 13 |
| Copolymer D | B (JIS) | 10.5 | 8.5 | 7.8 | 8.0 |
| | Soaking | 0 | 0 | 4 | 6 |
| Polysiloxane A | B (JIS) | 11.0 | 1.0 | 0.3 | 0.5 |
| | Soaking | 0 | 60 | 60 | 60 |
| None | B (JIS) | 0.2 | 0.3 | 0.5 | 0.5 |
| | Soaking | Longer than 60 | | | |

EXAMPLE 2

A mixture composed of 30 g of the copolymer D prepared in the preceding example and 3.0 g of a polyoxyethylene alkyl ether having an HLB value of 13.5 was dissolved in 67 g of water to give a semi-transparent solution, which is referred to as the base solution hereinbelow. Treatment baths A and B were prepared by dissolving 3.0 g of the above prepared base solution in 97.0 g of water (treatment bath A) and in 92.5 g of water together with 4.0 g of a 10% by weight aqueous dispersion of Polyurethane Elastron E-37 (a tradename by Daiichi Kogyo Seiyaku Co.) and 0.5 g of a 10% by weight aqueous dispersion of dibutyltin dilaurate emulsified by use of a non-ionic surface active agent (treatment bath B).

The same desized polyester knit cloth as used in Example 1 was dipped in the treatment bath A or B followed by squeezing to give a pick-up of 100% followed by drying at 100° C. for 5 minutes and then curing at 160° C. for 2 minutes. These treated cloths were subjected to the water drop soaking test to give the soaking time in seconds and the evaluation of feeling of softness by hand touching method either as treated or after 1 or 10 times of washing in the same manner as in Example 1 to give the results shown in Table 3 below.

EXAMPLE 3

Semi-transparent, highly viscous copolymers E, F, G and H were prepared each by reacting 0.02 mole of a dimethylpolysiloxane terminated at both molecular chain ends each with an active hydrogen-containing functional group X, which was hydroxy, mercapto, carboxyl or amino group for the copolymers E to H, respectively, and expressed by the formula

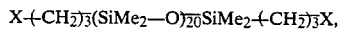

with 0.08 mole of a polyethyleneglycol having an average molecular weight of about 800 and 0.04 mole of hexamethylene diisocyanate in toluene in such an amount that the overall concentration of the above three reactants was 30% by weight followed by stripping of toluene by distillation under reduced pressure. The color of the copolymer H was yellow while the copolymers E, F and G were light yellow in color.

TABLE 3

| Treatment bath | Item of testing | As treated | After washing of | |
|---|---|---|---|---|
| | | | 1 time | 10 times |
| A | Soaking | 0 | 0 | 6 |
| | Feeling* | A | A | A-B |
| B | Soaking | 0 | 0 | 4 |
| | Feeling* | B | B | A-B |

*A: pleasantly soft;
B: poorer in softness than A

Each of the thus prepared copolymers was dissolved in toluene in a concentration of 1% by weight and the same desized polyester knit cloth as used in Example 1 was treated with the solution in the same manner as in Example 1 and subjected to the test of water absorptivity by the water drop soaking method to give the results shown in Table 4 below.

TABLE 4

| Copolymer | X | Water drop soaking, seconds | | |
|---|---|---|---|---|
| | | As treated | After washing | After 5 washings |
| E | Hydroxy | 0 | 0 | 2 |
| F | Mercapto | 0 | 1 | 5 |
| G | Carboxyl | 0 | 2 | 10 |
| H | Amino | 0 | 1 | 15 |
| (None) | — | Longer than 60 | | |

EXAMPLE 4

A light yellowish brown, highly viscous copolymer J was prepared by reacting 77.4 g of the same hydroxy-terminated dimethylpolysiloxane as used in the preparation of the copolymers B to D in Example 1 with 110.2 g of a stearylamine polyoxyethylene adduct diol of the formula

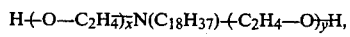

in which $x+y=20$, and 21.0 g of diphenylmethane diisocyanate in 500 g of toluene under agitation at 100° C. for 1 hour and for additional 3 hours with admixture of 0.1 g of tin octoate. After confirmation of the completion of the reaction by the infrared absorption spectrophotometry, the reaction mixture was freed from the solvent by distillation under reduced pressure to give the copolymer.

A 20 g portion of the above prepared copolymer J was uniformly dispersed in an aqueous solution of 4 g of a polyoxyethylene nonylphenyl ether having an HLB value of 13.5 in 76 g of water by agitating with a homomixer. A treatment bath was prepared by diluting the above prepare aqueous dispersion in water in a concentration of 4% by weight and the same tests for the water absorptivity as in Example 1 were undertaken with the same desized polyester knit cloth as used in Example 1 along with the feeling test for softness by hand touching either as treated or after washing of 1, 3 or 10 times to give the results shown in Table 5 below, which also includes the results carried out with the polysiloxane A used in Example 1 as well as the results obtained with an untreated cloth.

EXAMPLE 5

A copolymer K was prepared in a similar manner to Example 4 by reacting 82.8 g of the same hydroxy-terminated dimethylpolysiloxane as used in the preparation of the copolymer A in Example 1 with 115.0 g of a polyethyleneglycol having an average molecular weight of about 400, 5.0 g of a polyoxypropylene triol having an average molecular weight of about 3000 (Uniol TG 3000, a product by Nippon Yushi Co.) and 13.2 g of tolylene diisocyanate in 500 g of toluene containing 0.1 g of dibutyltin dilaurate followed by stripping of the solvent under reduced pressure. The copolymer K was a light yellow, somewhat cloudy fluid having a viscosity of 13,000 centipoise.

TABLE 5

| Treated with | Item of testing | As treated | \multicolumn{3}{c}{Times of washing} | | |
|---|---|---|---|---|---|
| | | | 1 | 3 | 10 |
| Copolymer J | B (JIS) | 11.2 | 9.5 | 8.3 | 7.5 |
| | Soaking | 0 | 1.0 | 2.5 | 3.0 |
| | Feeling | A | A | A | A |
| Polysiloxane A | B (JIS) | 11.0 | 1.0 | 0.3 | 0.5 |
| | Soaking | 0 | — | \multicolumn{2}{c}{Longer than 60} | |
| | Feeling* | A | C | C | C |
| None | B (JIS) | 0.2 | 0.3 | 0.5 | 0.5 |
| | Soaking | | \multicolumn{3}{c}{Longer than 60} | | |
| | Feeling* | C | C | C | C |

*C: coarse and hard feeling

A treatment bath was prepared by dissolving the above prepared copolymer K in toluene in a concentration of 4% by weight and the same desized polyester knit cloth as used in Example 1 was treated therewith in the same manner followed by the test of the water drop soaking to give results of 0 second as treated and after a single washing and 2 seconds and 4.5 seconds after 3 and 10 times of washing, respectively.

What is claimed is:

1. A fabric treatment agent which comprises, as the principal ingredient, a copolymer which is the polymerization product of three types of moieties including:

(a) a diorganopolysiloxane in a liquid form represented by the general formula $$X-R^1+SiR^2_2-O)_{\overline{n}}SiR^2_2-R^1-X,$$

in which $R^1$ is a divalent organic group, $R^2$ is a substituted or unsubstituted monovalent hydrocarbon group having from 1 to 20 carbon atoms, X is an active hydrogen-containing functional group selected from the class consisting of a hydroxy group —OH, mercapto group —SH, carboxyl group —COOH and amino group —NH$_2$ and n is a positive integer not smaller than 10;

(b) a polyol compound having polyoxyalkylene linkages in an amount from 1 to 10 moles per moles of the moiety (a) above; and (c) a diisocyanate compound in such an amount that the molar ratio —NCO/H of the isocyanate groups —NCO in the diisocyanate com-pound to the overall hydrogen atoms of the functional groups X in the moiety (a) and the hydroxy groups in the moiety (b) is in the range from 0.05 to 1.

2. The fabric treatment agent as claimed in claim 1 wherein the moiety (b) in the copolymer is a polyoxyalkylene glycol.

3. The fabric treatment agent as claimed in claim 2 wherein the polyoxyalkylene glycol is a polyoxyethylene glycol having an average molecular weight in the range from 100 to 5000.

4. The fabric treatment agent as claimed in claim 1 wherein the polyol compounds having polyoxyalkylene linkages in the molecule as the moiety (b) in the copolymer is an alkylamine polyoxyalkylene adduct represented by the general formula $$H+O-R^3)_{\overline{c}}NR^2+R^3-O)_{\overline{d}}H,$$

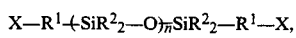

in which $R^3$ is a divalent hydrocarbon group having from 2 to 4 carbon atoms and c and d are each a positive integer.

5. The fabric treatment agent as claimed in claim 1 which is an aqueous emulsion of the copolymer.

6. The fabric treatment agent as claimed in claim 5 wherein the aqueous emulsion further contains am organic resin dispersible in water and a curing catalyst therefor.

7. The fabric treatment agent as claimed in claim 6 wherein the organic resin dispersible in water is a water-soluble polyurethane resin.

* * * * *